(12) United States Patent
Choi

(10) Patent No.: US 7,644,195 B2
(45) Date of Patent: Jan. 5, 2010

(54) HOST CONNECTABLE DEVICE CAPABLE OF SELECTING MODE USING MENU DISPLAYED AUTOMATICALLY UPON CONNECTING TO HOST DEVICE AND METHOD THEREOF

(75) Inventor: Juang-hwan Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 455 days.

(21) Appl. No.: 11/065,276

(22) Filed: Feb. 25, 2005

(65) Prior Publication Data

US 2005/0240710 A1 Oct. 27, 2005

(30) Foreign Application Priority Data

Apr. 26, 2004 (KR) ...................... 10-2004-0028600

(51) Int. Cl.
*G06F 3/00* (2006.01)
(52) U.S. Cl. ........................................................ 710/14
(58) Field of Classification Search .................... 710/14
See application file for complete search history.

(56) References Cited

U.S. PATENT DOCUMENTS

| 4,665,501 | A | * | 5/1987 | Saldin et al. .................... 710/8 |
| 6,005,613 | A | * | 12/1999 | Endsley et al. ............ 348/231.6 |
| 6,738,834 | B1 | * | 5/2004 | Williams et al. ................ 710/8 |
| 7,061,535 | B2 | * | 6/2006 | Misawa et al. .............. 348/375 |
| 7,092,024 | B2 | * | 8/2006 | Kawamura et al. ..... 348/333.12 |
| 2001/0005229 | A1 | * | 6/2001 | Misawa et al. ......... 348/333.01 |
| 2002/0008763 | A1 | * | 1/2002 | Kawamura et al. .......... 348/232 |
| 2002/0054224 | A1 | * | 5/2002 | Wasula et al. ............... 348/232 |
| 2002/0093583 | A1 | * | 7/2002 | Ito .............................. 348/373 |
| 2005/0168611 | A1 | * | 8/2005 | Yamaya .................. 348/333.01 |
| 2005/0237399 | A1 | * | 10/2005 | Endo ...................... 348/231.99 |

FOREIGN PATENT DOCUMENTS

| JP | 2000-196986 | | 7/2000 |
| JP | 2000-222337 | | 8/2000 |
| JP | 2001-202325 | * | 7/2001 |
| JP | 2001-290612 | | 10/2001 |
| KR | 2003-0057250 | | 7/2003 |

OTHER PUBLICATIONS

Nikki McDonald and Carla Thorton, "Full Exposure: Today's Best Digital Cameras", Oct. 2, 2002, PC World www.pcworld.com/article/id,104696-page,2/article.html.*
Fujifilm USA, finePix 2800 Zoom Owners Manual, pp. 9, 67-70 http://www.fujifilmusa.com/JSP/fuji/epartners/ServiceSupportProductContent.jsp?dbid=863506&prodcat=235315&sscucatid=664271.*
Compaq et al., Universal Serial Bus Specification, Apr. 27, 2000, Revision 2.0, pp. 199-209, 243, 253-274.*

* cited by examiner

*Primary Examiner*—Eron J Sorrell
(74) *Attorney, Agent, or Firm*—Roylance, Abrams, Berdo and Goodman, LLP

(57) ABSTRACT

A host connectable device for enabling a user to select a mode using a menu screen automatically provided upon connecting to a host device, and a mode selection method thereof. The host connectable device, that is capable of being connected to a host device and operating in one of a plurality of modes relating to the host device when the host connectable device is connected to the host device, is provided and includes a communication interface unit, a display unit, and a control unit for providing a mode selection menu screen on the display unit when the communication interface receives the connection signal of the host device.

10 Claims, 4 Drawing Sheets

HOST CONNECTABLE DEVICE CAPABLE OF SELECTING MODE USING MENU DISPLAYED AUTOMATICALLY UPON CONNECTING TO HOST DEVICE AND METHOD THEREOF

CROSS-REFERENCE TO RELATED APPLICATIONS

This application claims the benefit under 35 U.S.C. § 119 (a) of Korean Patent Application No. 10-2004-0028600 filed in the Korean Intellectual Property Office on Apr. 26, 2004, the entire disclosure of which is hereby incorporated by reference.

BACKGROUND OF THE INVENTION

1. Field of the Invention

The present invention relates generally to a host connectable device and a method for selecting a mode thereof. More particularly, the present invention relates to a host connectable device which can operate in connection with a host device and selectively execute one of a plurality of operation modes and a method thereof.

2. Description of the Related Art

A host connectable device refers to a device which operates independently or in relation with a host device such as a personal computer (PC) or a printer when connected to the host device. For example, the host connectable device may be a digital camcorder, a digital camera, and the like. Generally, a USB (Universal Serial Bus) is adopted to interface the host device and the host connectable device.

When being connected to the host device, the host connectable device selectively executes one of the operation modes provided. For example, a digital camcorder functions as a removable disk or a PC camera in connection with a PC.

A user selects a mode to be executed by the host connectable device. However, the mode selection has to be made prior to the connection to the host device. This mode selection is explained in greater detail below.

FIG. 1 is a flowchart of the mode selection of a conventional host connectable device. Referring to FIG. 1, the user calls a mode selection menu screen by operating the host connectable device at step S10. The user selects one of the modes displayed on the menu screen at step S20, and information on the selected mode is stored at step S30.

Next, the host connectable device is connected to the host device through a USB at step S40. The host connectable device then executes the selected mode at step S50 by the use of the information stored at step S30.

In the conventional arrangement as described above, the user has to select the mode prior to the connection of the host connectable device to the host device. This is because the host device recognizes the host connectable device simultaneously with its connection, and the host connectable device executes the selected mode upon the connection.

However, the user is very likely to attempt to connect the host connectable device to the host device and forget to perform the mode selection required prior to the connection. Similarly, the user attempts such a connection often being unaware of the several modes of the host connectable device which is connected to the host device.

Thus, the host connectable device operates in a mode selected in the previous connection or in a default mode. If such a mode is not desired by the user, the user has to disconnect the host connectable device, re-select a desired mode, and re-connect the host connectable device. This results in an increase in user inconvenience.

Accordingly, a need exists for a system and method for convenient mode selection upon connecting to a host device.

SUMMARY OF THE INVENTION

To address the above and other disadvantages of the conventional arrangement, an aspect of the present invention is to provide a host connectable device that is capable of automatically providing a menu screen relating to a mode selection upon connecting to a host device and executing a mode selected by a user through the menu screen, and a mode selection method thereof.

To achieve the above and other aspects of the present invention, a host connectable device that is capable of being connected to a host device and operating in one of a plurality of modes relating to the host device when the host connectable device is connected to the host device is provided and comprises a communication interface unit for transferring and receiving a connection signal to and from the host device and for communicating data with the host device, a display unit for displaying certain information, and a control unit for controlling the display of a mode selection menu screen on the display unit when the communication interface receives the connection signal of the host device.

The control unit controls the communication interface to transfer a mode selection completion signal to the host device when one of the plurality of modes is selected through the mode selection menu screen.

The communication interface unit operates according to a plug-and-play interface.

The host device is a personal computer, and the communication interface unit operates according to one of a universal serial bus (USB) interface and an IEEE 1394 interface.

Consistent with the above aspects of the present invention, an electronic device that is capable of being connected to an external electronic device and operating in one of a plurality of modes relating to the external electronic device when the electronic device is connected to the external electronic device is provided and comprises a communication interface unit for transferring and receiving a connection signal to and from the external electronic device and for communicating data with the external electronic device, a display unit for displaying certain information, and a control unit for controlling the display of a mode selection menu screen on the display unit when the communication interface receives the connection signal of the external electronic device.

The control unit controls the communication interface to transfer a mode selection completion signal to the external electronic device when one of the plurality of modes is selected through the mode selection menu screen.

Consistent with the above aspects of the present invention, an electronic device that is capable of being connected to an external electronic device and operating in one of a plurality of modes relating to the external electronic device when the electronic device is connected to the external electronic device is provided and comprises a communication interface unit for transferring and receiving a connection signal to and from the external electronic device and for communicating data with the external electronic device, and a control unit for generating a control signal to generate a mode selection menu screen when the communication interface unit receives the connection signal of the external electronic device and for transferring the control signal to the external electronic device through the communication interface so that the mode selection menu screen is displayed on the external electronic device.

A method is further provided for selecting a mode of an electronic device which can operate in one of a plurality of modes relating to an external electronic device when the electronic device is connected to the external electronic device, the method comprising the steps of receiving a connection signal from the external electronic device and displaying a mode selection menu screen when the connection signal is received.

The method further comprises the steps of receiving one of the plurality of modes selected through the mode selection menu screen and transferring a mode selection completion signal to the external electronic device when the mode selection is received.

The external electronic device comprises a host device, and the electronic device comprises a host connectable device.

The host device can comprise a personal computer, and the host connectable device can comprise one of a universal serial bus (USB) device and an IEEE 1394 device.

The display step further displays the mode selection menu screen on a screen of one of the electronic devices and the external electronic devices.

BRIEF DESCRIPTION OF THE DRAWING FIGURES

These and other aspects and advantages of the present invention will become apparent and more readily appreciated from the following description of exemplary embodiments, taken in conjunction with the accompanying drawing figures of which:

Throughout the drawings, like reference numerals will be understood to refer to like parts, components and structures.

DETAILED DESCRIPTION OF EXEMPLARY EMBODIMENTS

Figure 1:
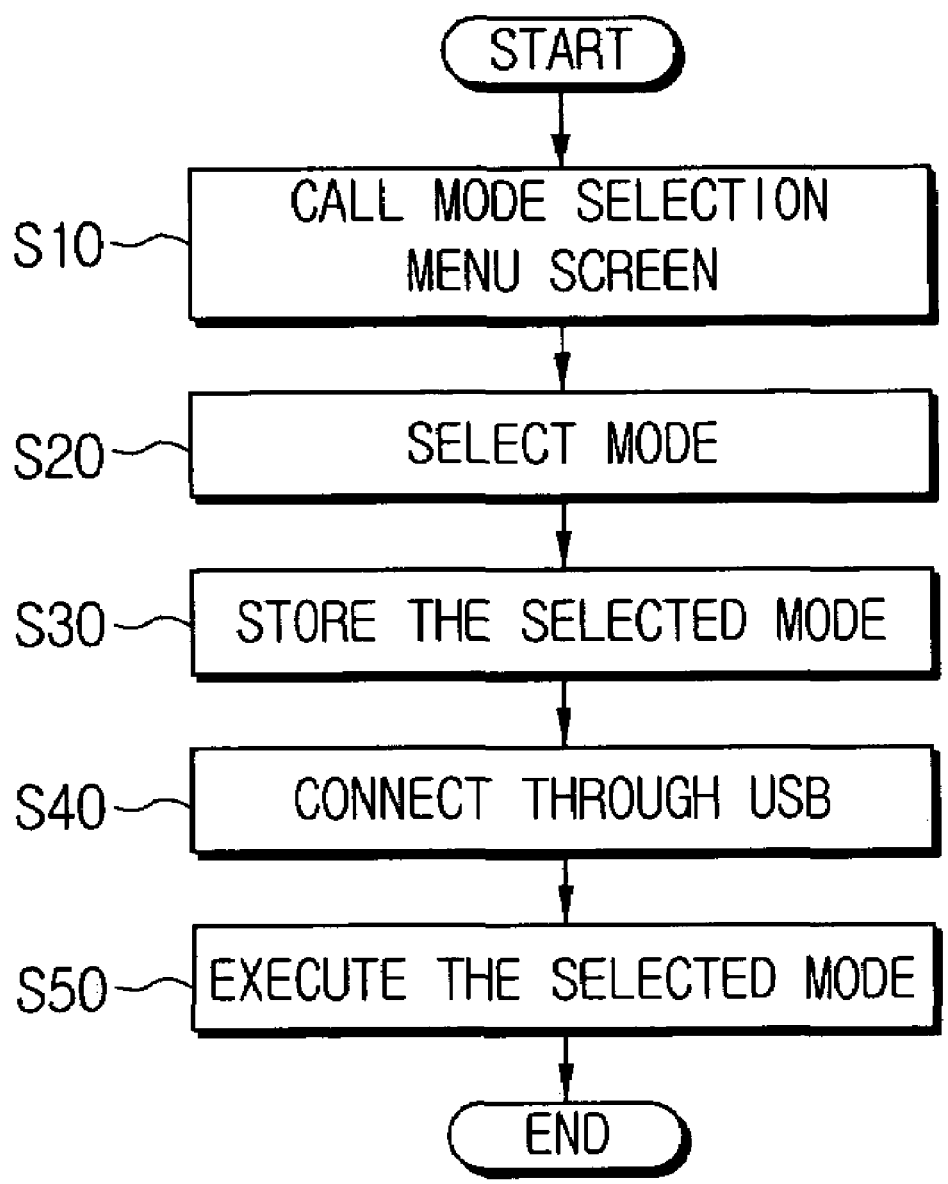
FIG. 1 is a flowchart of a mode selection method of a conventional host connectable device.

Reference will now be made in detail to embodiments of the present invention, examples of which are illustrated in the accompanying drawings wherein like reference numerals refer to the like elements throughout. The embodiments are described below in order to explain the present invention by referring to the drawings.

Figure 2:
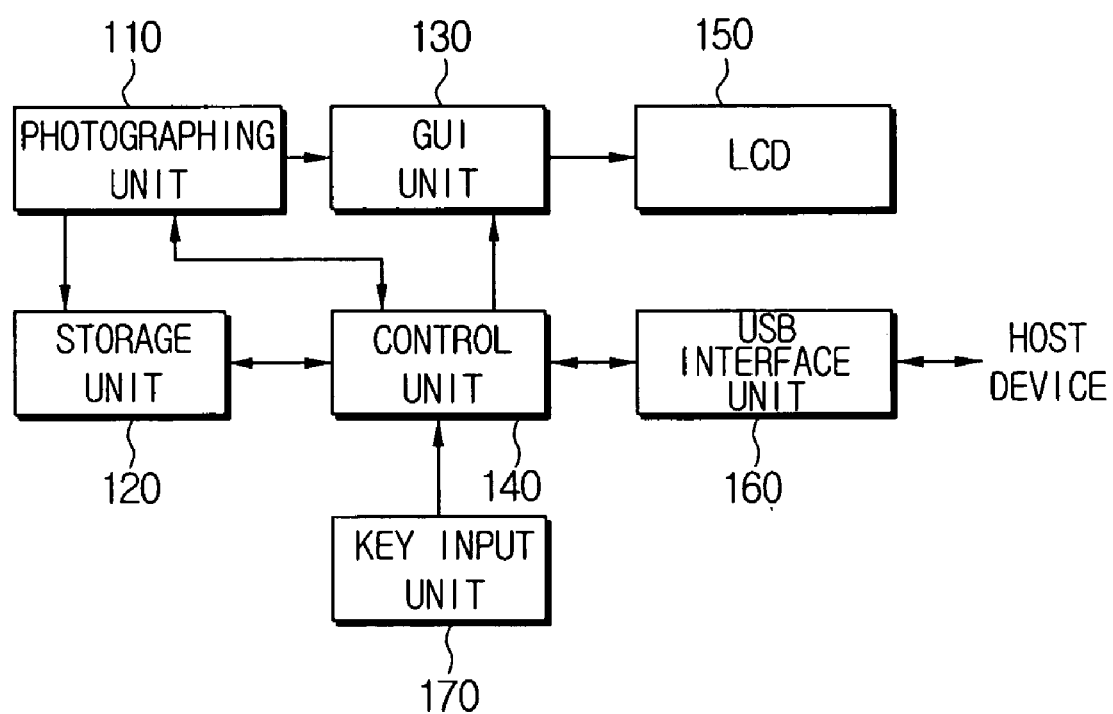
FIG. 2 is a block diagram of an electronic host connectable device, such as a digital camcorder, enabling a user to select a mode by the use of a menu screen automatically displayed upon connecting to a host device according to an embodiment of the present invention.

FIG. 2 is a block diagram of an electronic host connectable device, such as a digital camcorder, enabling a user to select a mode by the use of a menu screen automatically displayed upon connecting to a host device according to an embodiment of the present invention. Referring to FIG. 2, the digital camcorder includes a photographing unit 110, a storage unit 120, a GUI (Graphic User Interface) unit 130, a control unit 140, a LCD (Liquid Crystal Display) 150, a USB (Universal Serial Bus) interface unit 160, and a key input unit 170.

The photographing unit 110 generates digital image data corresponding to an image produced through a lens (not shown). The storage unit 120 is a recording medium for storing the digital image data generated in the photographing unit 110.

The GUI unit 130 stores graphic data, such as a menu screen, required for constructing a GUI environment. The GUI unit 130 combines the menu screen and the image photographed by the photographing unit 110 under the control of the control unit 140.

The LCD 150 displays the image photographed by the photographing unit 110, the image stored in the storage unit 120, and the menu screen generated by the GUI unit 130.

The USB interface unit 160 communicates USB data with the host device such as a PC, under the control of the control unit 140.

The key input unit 170 is a user interface device for receiving and transferring an operation command from a user to the controller 140.

The control unit 140 controls the overall operations of the digital camcorder according to the user's operation command received through the key input unit 170. Specifically, the control unit 140 controls the generation of the menu screen of the GUI unit 130 and the communication of the USB interface unit 160.

As described above, the digital camcorder functions mainly to photograph the image through the photographing unit 110, store the photographed image in the storage unit 120, and display the photographed or stored image on the LCD 150.

When the digital camcorder is connected to a PC, the digital camcorder provides modes for operating in relation with the PC. Specifically, upon connecting to the PC, the digital camcorder serves as a removable disk or a PC camera.

Figure 3:
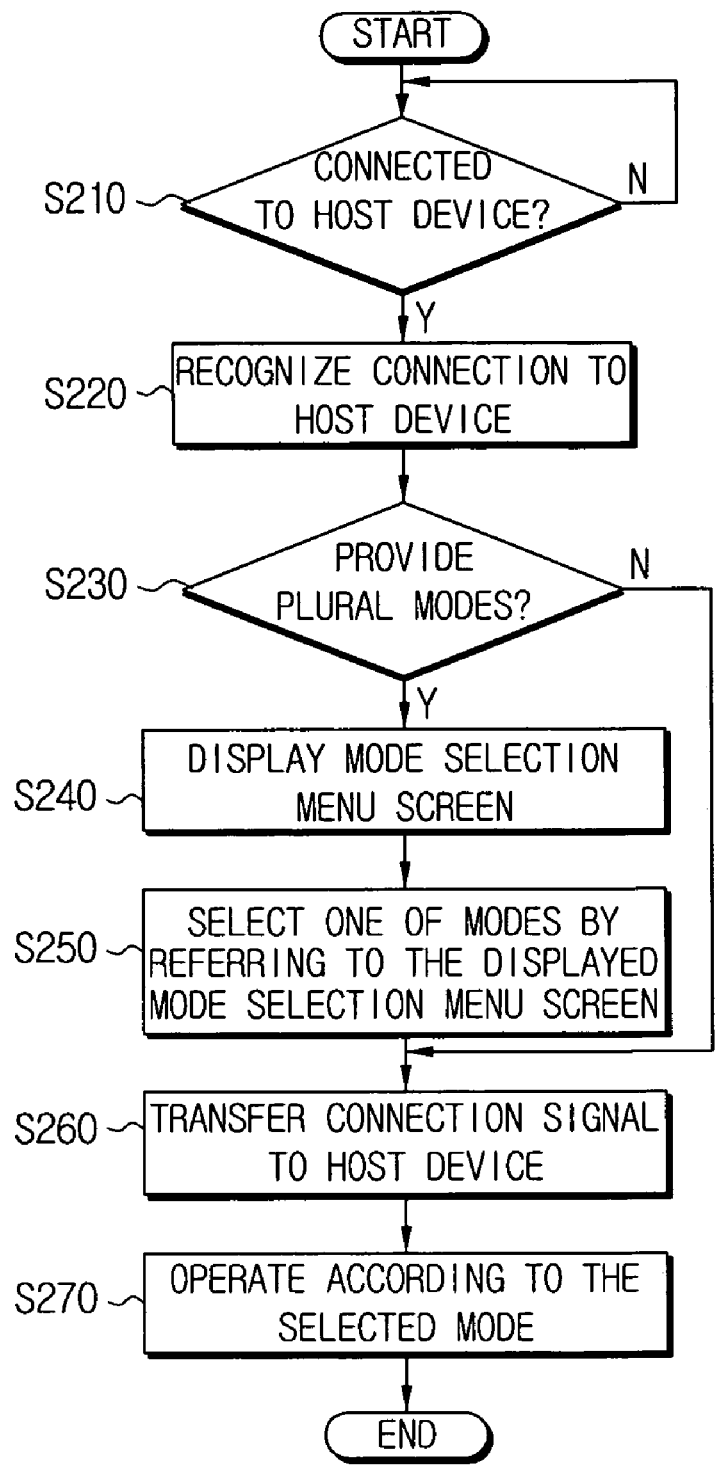
FIG. 3 is a flowchart of a mode selection method using a menu screen that is automatically displayed upon the connection to the host device according to an embodiment of the present invention.

When the digital camcorder of FIG. 2 is connected to the host device such as a PC, a mode selection occurs in accordance with an embodiment of the present invention as described in greater detail below. FIG. 3 is a flowchart of a mode selection method using a menu screen automatically displayed upon the connection to the host device according to an embodiment of the present invention.

Referring to FIG. 3, when the user connects the digital camcorder to the host device using a USB cable at step S210, the control unit 140 recognizes that the digital camcorder is connected to the host device at step S220.

The digital camcorder and the host device recognize the connection by sending and receiving a connection signal. Specifically, when the USB cable is connected, the host device applies an electric signal of 5V to a Vcc port of a USB connector as the connection signal. The applied electric signal is sent to the digital camcorder through the USB cable. Upon receiving the electric signal, the USB interface unit 160 notifies the control unit 140 of the signal reception. Accordingly, the control unit 140 recognizes that the digital camcorder is connected to the host device.

However, the digital camcorder does not send any connection signal to the host device. Thus, the host device does not recognize the connection of the digital camcorder.

Upon detecting the connection to the host device, if the control unit 140 determines that the digital camcorder provides a plurality of modes relating to the host device at step S230, the control unit 140 controls the GUI unit 130 to display the mode selection menu screen on the LCD 150 at step S240.

Figure 4:
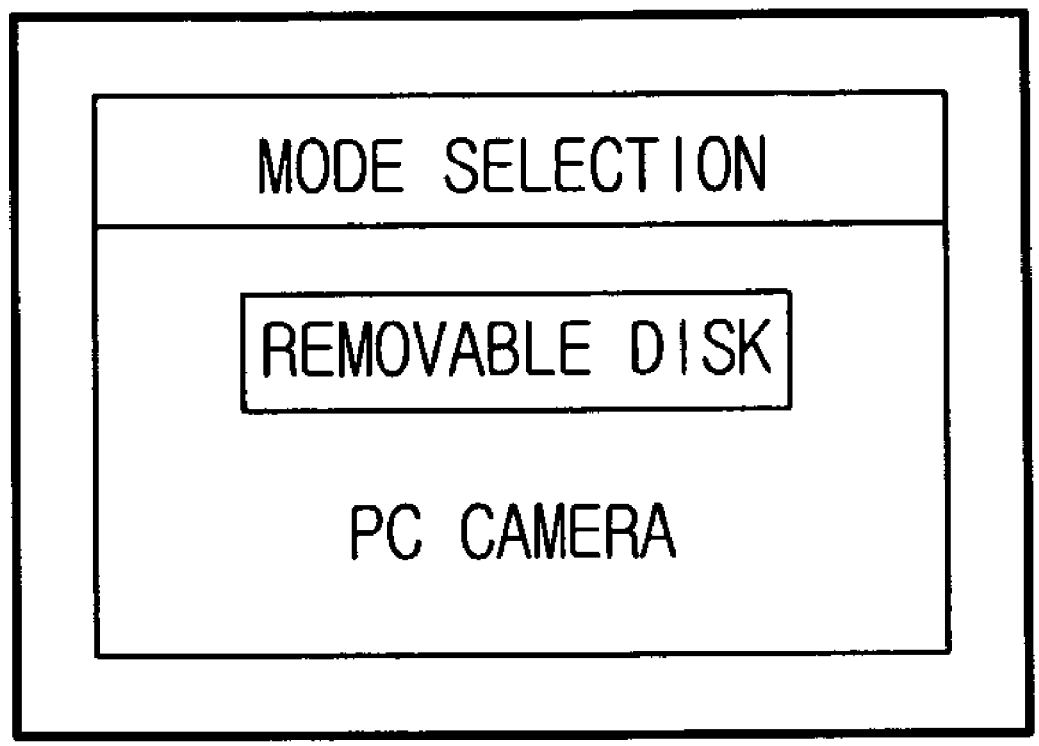
FIG. 4 is a view of an example of a mode selection menu screen that can be automatically displayed according to an embodiment of the present invention.

An example of a mode selection menu screen that can be displayed on the LCD 150 is depicted in FIG. 4. Referring to FIG. 4, the example menu screen displays a "removable disk" mode and a "PC camera" mode as the plurality of the provided modes, and a "cursor" for selecting one of the modes.

The steps S210 through S240 are described in light of a user's perspective. That is, once the user connects the digital camcorder to the host device, the mode selection menu screen is provided automatically through the LCD 150 to the user without having to perform a separate operation.

Returning to FIG. 3, the user then selects one of the plurality of modes by referring to the mode selection menu screen displayed on the LCD 150 at step S250.

If the user's selection is completed, the control unit 140 controls the USB interface unit 160 to transfer the connection signal (or a mode selection completion signal) to the host device at step S260. Upon receiving the signal, the host device recognizes that the digital camcorder is connected.

More specifically, the USB interface unit 160 applies an electric signal of 3~4V to the D+ and D− ports of the USB ports as the connection signal (or the mode selection completion signal). The applied electric signal is sent to the host device through the USB cable. Upon receiving the electric signal, the host device recognizes the connection of the host connectable device, which is the digital camcorder in this example.

The digital camcorder then operates at step S270 according to the mode selected at step S250. For example, if the removable disk mode is selected at step S250, the data stored in the storage unit 120 is transferred to the PC or the data transferred from the PC is stored in the storage unit 120 through the USB interface unit 160. If the PC camera mode is selected at step S250, the image photographed by the photographing unit 110 is transferred to the PC through the USB interface unit 160.

The host connectable device in the exemplary embodiment of the present invention comprises, but is not limited to, the digital camcorder, and the host device comprises, but is not limited to, the PC. Other types of host connectable devices and host devices can be used. That is, any host connectable device can be employed which can selectively provide several operation modes when being connected to the host device.

In addition, the removable disk and the PC camera are exemplified as the plurality of modes provided by the digital camcorder, but any number of different modes and mode combinations can be provided.

The mode selection menu screen is displayed on the LCD 150 of the host connectable device according to the exemplary embodiment of the present invention. However, the mode selection menu screen may be displayed on the host device. In this case, when the connection signal of the host device is received at the USB interface unit 160, the host connectable device generates and transfers a control signal for generating the mode selection menu screen to the host device through the USB interface unit 160. Upon receiving the control signal, the host device displays the mode selection menu screen and allows the user to select a desired mode of the host connectable device.

The USB interface is exemplified for connecting the host connectable device and the host device, but any number of interface protocols can be used. Also, any number of plug-and-play technologies can be applied to the present invention, including IEEE 1394 interfacing.

The exemplary embodiment of the present invention further shows a host connectable device connected to a host device, however, the present invention can be applied to any situation wherein two electronic devices are connected to each other.

In light of the above description, when the host connectable device is connected to the host device, the menu screen relating to the mode selection is automatically provided and the host connectable device operates according to the mode selected by the user through the menu screen. Therefore, the user can easily operate the device with the opportunity to select the mode being automatically provided, even if the user connects the host connectable device without selecting the mode of the host connectable device prior to the connection or without being aware of the several modes of the host connectable device.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A host connectable device that is capable of being connected to a host device and operating in one of a plurality of modes relating to the host device when the host connectable device is connected to the host device, the host connectable device comprising:
    a communication interface unit for detecting a connection with the host device prior to connection detection by the host device, and for then communicating data with the host device;
    a display unit for displaying information; and
    a control unit for controlling a display of a mode selection menu screen on the display unit in response to the detection by the communication interface unit of the connection with the host device and upon completion of the mode selection, controlling the communication interface unit to transfer a mode selection completion signal to the host device when one of the plurality of modes is selected through the mode selection menu screen.

2. The host connectable device of claim 1, wherein the communication interface unit operates according to a plug-and-play interface.

3. The host connectable device of claim 1, wherein:
    the host device comprises a personal computer, and wherein the communication interface unit operates according to one of a universal serial bus (USB) interface and an IEEE 1394 interface.

4. An electronic device that is capable of being connected to an external electronic device and operating in one of a plurality of modes relating to the external electronic device when the electronic device is connected to the external electronic device, the electronic device comprising:
    a communication interface unit for detecting a connection with the external electronic device prior to connection detection by the external electronic device, and for then communicating data with the external electronic device;
    a display unit for displaying information; and
    a control unit for controlling a display of a mode selection menu screen on the display unit in response to the detection by the communication interface unit of the connection with the external electronic device and upon completion of the mode selection, controlling the communication interface unit to transfer a mode selection completion signal to the external electronic device when one of the plurality of modes is selected through the mode selection menu screen.

5. An electronic device that is capable of being connected to an external electronic device and operating in one of a plurality of modes relating to the external electronic device when the electronic device is connected to the external electronic device, the electronic device comprising:

a communication interface unit for detecting a connection with the external electronic device prior to connection detection by the external electronic device, and for then communicating data with the external electronic device; and a control unit for generating a control signal to generate a mode selection menu screen in response to the detection by the communication interface unit of the connection with the external electronic device, and for transferring the control signal to the external electronic device through the communication interface unit so that the mode selection menu screen is displayed on the external electronic device, receiving a mode selection from the external electronic device, and upon completion of the mode selection, transferring a mode selection completion signal to the external electronic device when the mode selection is received from the external electronic device.

6. A method for selecting a mode of an electronic device which can operate in one of a plurality of modes relating to an external electronic device when the electronic device is connected to the external electronic device, the method comprising the steps of:

controlling the electronic device to detect a connection signal with the external electronic device prior to connection detection by the external electronic device;

displaying a mode selection menu screen in response to the detection of the connection signal; and selecting a mode from the mode selection menu screen and upon completion of the mode selection, transferring a mode selection completion signal to the external electronic device when the mode selection is completed.

7. The method of claim 6, further comprising the steps of:

selecting one of the plurality of modes through the mode selection menu screen at the electronic device or receiving one of the plurality of modes selected through the mode selection menu screen from the external electronic device, to complete the mode selection.

8. The method of claim 6, wherein the external electronic device comprises a host device, and the electronic device comprises a host connectable device.

9. The method of claim 8, wherein the host device comprises a personal computer, and the host connectable device comprises one of a universal serial bus (USB) device and an IEEE 1394 device.

10. The method of claim 6, wherein the displaying step further comprises the step of:

displaying the mode selection menu screen on a screen of one of the electronic device and the external electronic device.

* * * * *

UNITED STATES PATENT AND TRADEMARK OFFICE
CERTIFICATE OF CORRECTION

PATENT NO.        : 7,644,195 B2                                        Page 1 of 1
APPLICATION NO. : 11/065276
DATED             : January 5, 2010
INVENTOR(S)       : Juang-hwan Choi It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 654 days.

Signed and Sealed this

Sixteenth Day of November, 2010

David J. Kappos
*Director of the United States Patent and Trademark Office*